(12) United States Patent
Humbertjean et al.

(10) Patent No.: US 10,611,663 B2
(45) Date of Patent: Apr. 7, 2020

(54) DEVICE AND METHOD FOR PRODUCING GLASS PRODUCTS FOR PRIMARY PHARMACEUTICAL PACKAGING

(71) Applicant: SCHOTT AG, Mainz (DE)

(72) Inventors: Alexander Humbertjean, Bad Krozingen (DE); Xaver Jud, Neukirch a.d. Thur (CH); Oliver Fruhner, Mainz (DE)

(73) Assignee: SCHOTT AG, Mainz (DE)

( * ) Notice: Subject to any disclaimer, the term of this patent is extended or adjusted under 35 U.S.C. 154(b) by 450 days.

(21) Appl. No.: 15/411,049

(22) Filed: Jan. 20, 2017

(65) Prior Publication Data

US 2017/0203993 A1 Jul. 20, 2017

(30) Foreign Application Priority Data

Jan. 20, 2016 (DE) .......................... 10 2016 100 923

(51) Int. Cl.
*C03B 23/04* (2006.01)
*C03B 23/045* (2006.01)

(52) U.S. Cl.
CPC ................................. *C03B 23/045* (2013.01)

(58) Field of Classification Search
CPC ......... C03C 13/00; C03C 17/00; C03C 19/00; C03C 23/0075; C03C 25/10; C03C 25/36; C03C 3/089
See application file for complete search history.

(56) References Cited

U.S. PATENT DOCUMENTS

| | | | |
|---|---|---|---|
| 2,110,327 A * | 3/1938 | Dichter | C03B 23/112 65/268 |
| 2,230,075 A | 1/1941 | Chase | |
| 2,297,335 A | 9/1942 | Wheaton, Jr. | |
| 2,661,576 A * | 12/1953 | Gartner | H01J 5/24 279/118 |
| 3,852,054 A | 12/1974 | Dichter | |
| 4,226,607 A * | 10/1980 | Domken | A61J 1/065 65/105 |
| 4,278,459 A * | 7/1981 | Partus | C03B 37/01846 65/144 |
| 4,981,505 A | 1/1991 | Männl | |
| 5,127,929 A * | 7/1992 | Gunther | C03B 23/07 65/271 |
| 5,658,365 A * | 8/1997 | Chludzinski | C03B 37/0148 65/283 |
| 5,672,192 A * | 9/1997 | Fleming, Jr. | C03B 23/043 65/391 |

FOREIGN PATENT DOCUMENTS

EP 0846665 6/1998
WO 0009455 2/2000

* cited by examiner

*Primary Examiner* — Jodi C Franklin
(74) *Attorney, Agent, or Firm* — Ohlandt, Greeley, Ruggiero & Perle, L.L.P.

(57) ABSTRACT

A device for producing glass products for primary pharmaceutical packaging is provided. The device includes a clamping chuck for clamping a glass product, a drive for driving the clamping chuck rotatingly about a longitudinal axis thereof, and a burner for heating a glass products received within the clamping chuck. The clamping chuck has a baffle structure for generating a gas current for cooling the clamping chuck when the clamping chuck is rotatingly driven about a longitudinal axis thereof while the glass product is heated above its softening temperature for hot-forming.

24 Claims, 2 Drawing Sheets

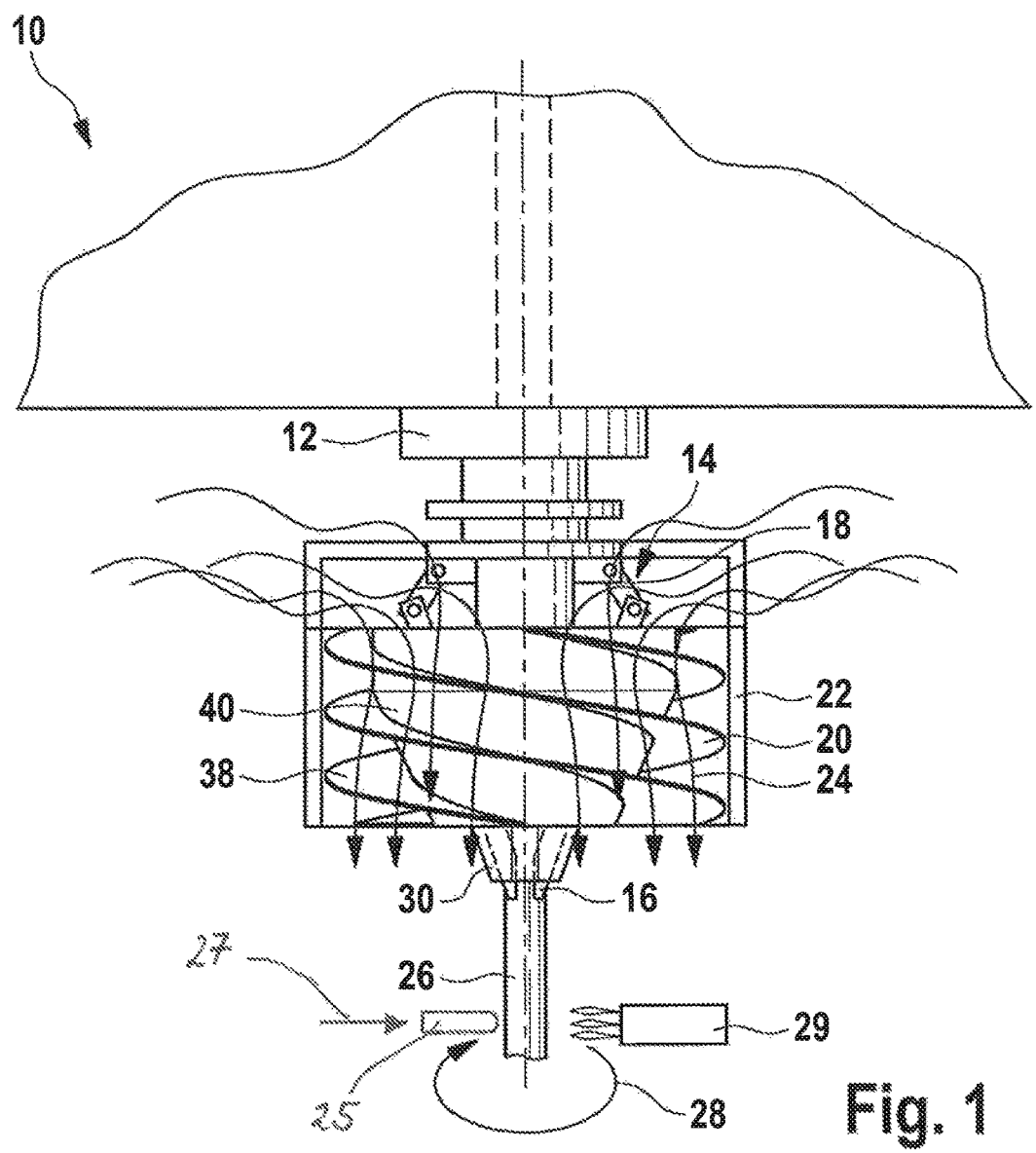
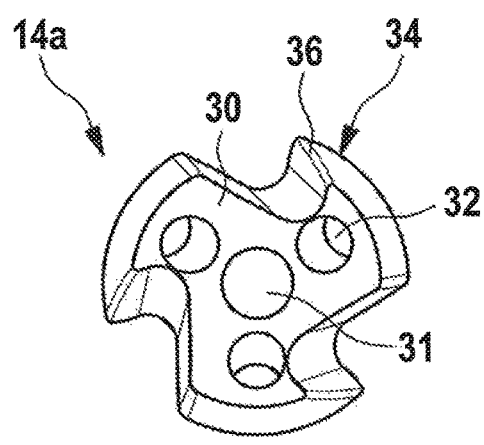 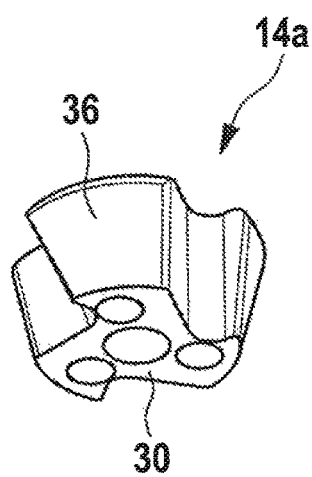
FIG. 2a  FIG. 2b

DEVICE AND METHOD FOR PRODUCING GLASS PRODUCTS FOR PRIMARY PHARMACEUTICAL PACKAGING

CROSS REFERENCE TO RELATED APPLICATIONS

This application claims priority from German patent application 10 2016 100 923.7, filed on Jan. 20, 2016. The entire content of this priority application is incorporated herein by reference.

BACKGROUND

1. Field of the Invention

The invention relates to a device and a method for producing glass products suitable for primary pharmaceutical packaging.

2. Description of Related Art

During hot-forming of glass products, such as glass tubes, for producing pharmaceutical packagings, such as vials, carpules, syringes or ampules, often rotating devices are used in the hot-forming. Herein the tubes are loaded vertically through a hollow clamping chuck and are clamped behind the region to be formed. The region to be formed advances clock-actuated or continuously through several burner and forming stations. After circulation on the parent machine the severing from the tool and a transfer to the bottom machine is performed. Herein the second end of the tube segment again advances through different burner and forming stations. Usual clamping chucks are designed to hold and guide the glass tubes.

However in the course of time a considerable heating of the clamping chucks occurs. At various burner stations flames may strike onto the clamping chucks and may lead to a locally higher thermal load (>400° C.).

SUMMARY OF THE INVENTION

According to one aspect of the invention a device and a method for producing glass products suitable for primary pharmaceutical packaging shall be disclosed that lead to an improved cooling of the clamping chuck during hot-forming.

According to another aspect of the invention a device and a method for producing glass products suitable for primary pharmaceutical packaging shall be disclosed that lead to a selective cooling of the glass product during hot-forming avoiding an undesired deformation at parts thereof that shall not be deformed.

According one aspect of the invention there is disclosed a device for producing glass products for primary pharmaceutical packaging, comprising: a clamping chuck for clamping a glass product; a drive for driving said clamping chuck rotatingly about a longitudinal axis thereof; a burner for heating a glass products received within said clamping chuck; wherein said clamping chuck comprises a baffle structure for generating a gas current for cooling said clamping chuck when said clamping chuck is driven rotatingly.

According another aspect of the invention there is disclosed a method for producing glass products for primary pharmaceutical packaging, comprising the steps of: providing a clamping chuck for clamping a glass product, said clamping chuck comprising a baffle structure; providing a drive for driving said clamping chuck rotatingly about a longitudinal axis thereof; providing a burner for heating a glass products received within said clamping chuck; driving said clamping chuck about its longitudinal axis; heating said glass product above its softening temperature while rotating said clamping chuck; hot-forming said glass product; and cooling at least said clamping chuck and/or said glass product selectively during rotation using said baffle structure.

The design of the baffle structure itself may vary in various ways to ensure an optimized cooling of the clamping chuck, depending on the local conditions. Basically the cooling means is "passive", i.e. the cooling effect is generated by a rotation of the clamping chuck. The baffle structure may be received at the clamping chuck, or the clamping chuck itself may be designed as a baffle structure, so that a cooling effect is generated by the rotation of the clamping chuck.

In addition the clamping chuck is kept clean by the current action and possible condensates that may settle on the clamping chuck or on the glass product, are also largely removed.

According to a further development of the invention the clamping chuck at its outer surface is designed as a baffle structure.

In this way the clamping chuck itself is used for cooling.

According to a further development of the invention at the clamping chuck a structured surface is provided for generating a gas current.

This is a possibility for generating a gas current.

According to a further development of the invention the clamping chuck comprises a clamping head, the outer surface of which is provided with protrusions that are configured as baffle elements.

Also in this way an effective cooling is ensured.

According to a further development of the invention the baffle structure is attached to the clamping chuck, in particular is welded thereon or is secured within recessions of the clamping chuck, in particular in slots, preferably by means of press-fitting.

By utilizing a separate baffle structure that is attached to the clamping chuck a particular effective cooling is reached.

According to a further development of the invention the baffle structure is configured as a plurality of baffle plates or ridges provided at the clamping chuck for generating a gas current.

In this way the effective cooling can be ensured.

According to a further development of the invention the baffle plates are surrounded from the outside by means of a cover, preferably of an annular shape.

In this way a particular suction effect can be generated.

According to a further development of the invention the baffle structure comprises a plurality of baffle plates extending in axial direction or at an angle thereto.

The baffle plates may at least partially be straight, however, may also be at least partially curved.

With these embodiments an effective cooling can be ensured.

According to a further development of the invention the baffle plates are received on a central support body.

Thereby a simple mounting and securing of the baffle plates is ensured.

The support body according to a further development of the invention is shaped conically tapering to the outside.

In this way the support body can be adapted to the shape of the clamping chuck.

According to a further development of the invention the support body consists of ridges or of a sheet that preferably is provided with recesses.

In this way it can be ensured that the cooling effect is not only generated outside of the support body, but also a cooling effect is generated within the space enclosed by the support body.

According to a further development of the invention the baffle plates are arranged at regular intervals displaced with respect to each other.

In an alternative design of the invention the baffle plates are arranged helically.

With both embodiments an effective cooling can be ensured.

According to a further development of the invention the baffle structure is configured for generating a gas current that is at least partially directed onto a glass product received within the clamping chuck.

Thus, the cooling effected at the clamping chuck also can be selectively be used for cooling the glass product, in particular within its clamping region, to thus counteract undesired deformations of the glass product during the hot-forming process.

BRIEF DESCRIPTION OF THE DRAWINGS

It will be understood that the features of the invention mentioned before and to be mentioned hereinafter cannot only be used in the respective given combination, but also in different combinations or independently, without departing from the scope of the invention. Further features and advantages of the invention can be taken from the subsequent description of preferred embodiments with reference to the drawings. In the drawings show:

FIG. 1 illustrates a simplified partially sectioned representation of a rotary drive including a clamping chuck according to the invention;

FIGS. 2a and 2b illustrate a clamping head of a clamping chuck, wherein the outer surface is configured as a baffle structure;

DETAILED DESCRIPTION

Figure 3A:
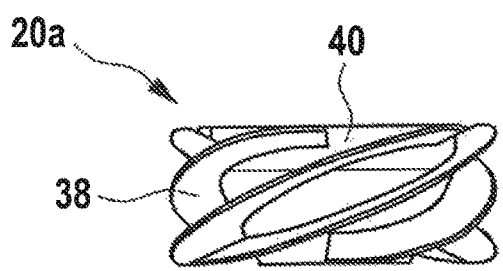
FIGS. 3a to 3d illustrate a further baffle structure comprising a plurality of baffle plates.

In FIG. 1 a first embodiment of a device according to the invention is designated in total with numeral 10.

The device 10 comprises a clamping chuck 14 for receiving tube-shaped glass products 26. The clamping chuck 14 comprises a clamping arrangement of clamping rods 18 by means of which clamping means 16 configured as additional clamping rods can be driven through assigned guiding openings within a clamping head 30 for clamping a tube-shaped glass product 26.

By means of the rotary drive 12 the clamping chuck 14 is driven rotatingly, as indicated by the arrow 28.

To ensure a cooling of the clamping chuck 14, at the clamping chuck 14 there is received a baffle structure that is designated in total with 20.

Herein this is configured as a plurality of helically arranged baffle plates 38 which are held on a central support body 40. If the clamping chuck 14 is driven rotatingly by the rotary drive 12, then an air current is generated by the baffle plates 38, such as indicated by the arrows 24.

In addition optionally the baffle plates 38 may be enclosed by an envelope 22 which is preferably annular. In this way a suction effect between the envelope and the baffle plates 38 can be generated. In particular the air current is directed onto the outer end of the clamping chuck 14 in the region of the clamping head 30 wherein the strongest heating is input.

In addition exemplarily a burner 29 is indicated by means of which the glass product 26 is heated up to a temperature above its softening temperature for hot-forming for then enabling a hot-forming process. Also with reference numeral a forming tool 25 is depicted exemplarily that may be moved towards the glass product in the direction of arrow 27 to facilitate hot-forming when the glass product 26 is heated sufficiently above its softening temperature.

In FIGS. 2a and 2b an alternative design of a clamping chuck is designated in total with 14a. Herein for similar parts corresponding reference numerals are used.

Herein only the clamping head 30 can be seen, within which a central recess 31 for feeding a glass product 26 therethrough is provided. At the outside three recesses 32 extend within the clamping head 30 being configured as guiding openings for the clamping means 16.

In the embodiment shown only the clamping head 30 is configured so that its outer surface is designed vane-like, so that in total three baffle structures are formed.

By the particular design of the outer shape of the clamping head 30 thus an air current and thus a cooling effect is generated without additional baffle plates.

Figure 3C:
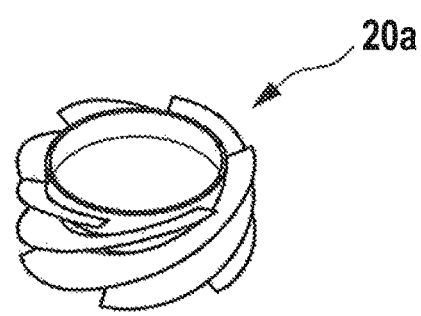
Figure 3B:
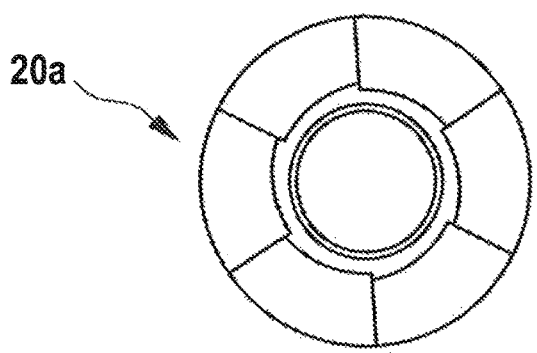
Figure 3D:
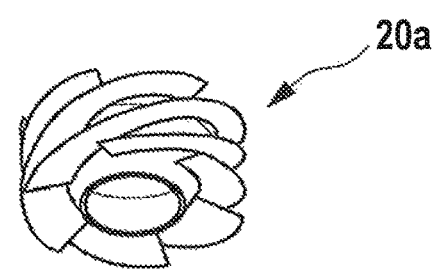
Figure 4A:
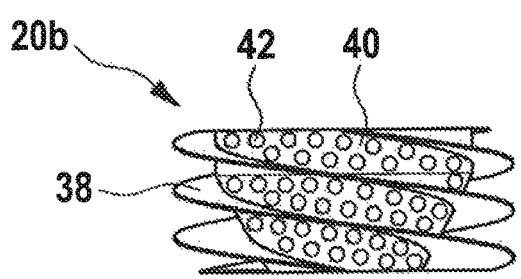
FIGS. 4a to 4d illustrate a further embodiment of a baffle structure according to the invention, wherein the baffle plates are arranged helically.
Figure 4C:
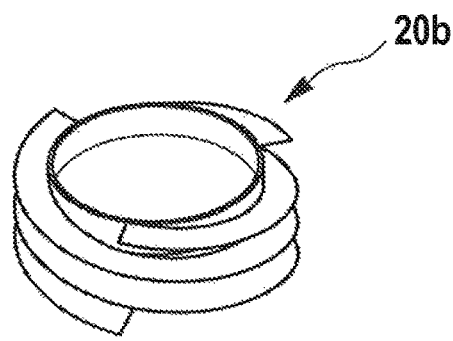
Figure 4B:
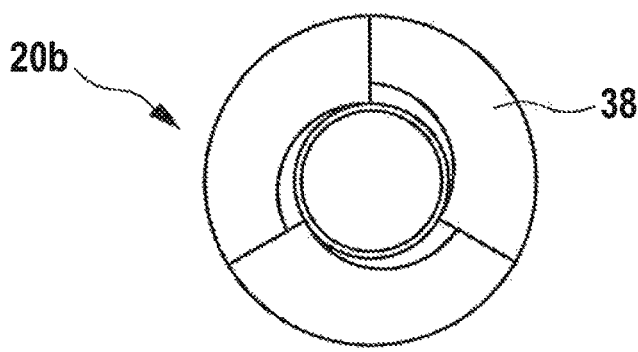
Figure 4D:
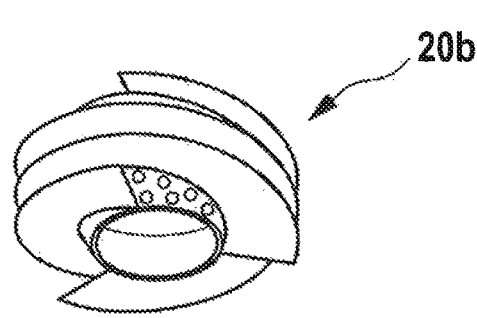

In FIGS. 3a to 3d and 4a to 4d further embodiments of the baffle structure according to the invention are shown exemplarily and designated in total with 20a and 20b, respectively. Again for similar parts corresponding reference numerals are used.

In FIGS. 3a to 3d a baffle structure 20a is shown wherein the baffle plates 38 extend at even intervals with respect to each other along an outer perimeter of a central support body 40. The central support body 40 herein extends conically to the outside, so that an adaptation of the shape to the conical shape of the clamping chuck 14 results.

Also with such a design a very effective cooling can be reached.

In FIGS. 4a to 4d a further design of a cooling means is designated in total with 20b.

This embodiment substantially corresponds to the embodiment according to FIG. 1, however without the envelope 22. In addition the central support body 40 is provided with recesses 42, such as in the shape of a perforated sheet. By these recesses 42 it is effected that the generated air current acts not only outside of the support body 40, but also within the space enclosed by the support body 40, so that also in this region a cooling of the clamping chuck 14 occurs.

Alternatively, instead of designing the central support body 40 with a perforated sheet also only a rod arrangement extending an axial direction with several ridges could be provided, wherein the baffle plates 38 are secured. With such a design there results a particularly effective transfer of the generated air current also directly onto the clamping chuck 14.

What is claimed is:

1. A device for producing glass products for primary pharmaceutical packaging, comprising:
   a clamping chuck having additional clamping rods for clamping a glass product;
   a drive for driving said clamping chuck rotatingly about a longitudinal axis thereof; and
   a burner for heating the glass product received within said clamping chuck;
   wherein said clamping chuck further comprises a baffle structure configured to be rotated with the clamping chuck for generating a gas current for cooling said clamping chuck when said clamping chuck is driven rotatingly.

2. The device of claim 1, wherein said clamping chuck has an outer surface that is configured as a baffle structure.

3. The device of claim 2, wherein at said clamping chuck there is provided a structured surface for generating a gas current.

4. The device of claim 3, wherein said clamping chuck comprises a clamping head, the outer surface being provided with protrusions that are configured as baffle elements.

5. The device of claim 1, wherein said baffle structure is secured on said clamping chuck.

6. The device of claim 5, wherein said baffle structure is welded to said clamping chuck or is attached by press-fitting.

7. The device of claim 1, wherein the baffle structure comprises a plurality of baffle plates provided on said clamping chuck for generating a gas current.

8. The device of claim 7, wherein said baffle plates are enclosed from the outside by an annular enclosure.

9. The device of claim 1, wherein said baffle structure comprises baffle plates extending in axial direction or at an angle thereto.

10. The device of claim 9, wherein said baffle plates are at least partially straight.

11. The device of claim 9, wherein said baffle plates are at least partially curved.

12. The device of claim 9, wherein said baffle plates are held on a central support body.

13. The device of claim 12, wherein said support body tapers conically to the outside.

14. The device of claim 12, wherein said support body comprises openings.

15. The device of claim 14, wherein said support body is configured as a perforated sheet.

16. The device of claim 12, wherein said support body comprises ridges whereon baffle plates are secured.

17. The device of claim 9, wherein said the baffle plates are arranged at angular intervals displaced with respect to each other.

18. The device of claim 9, wherein said baffle plates are arranged helically.

19. The device of claim 1, wherein said baffle structure is configured for generating a gas current that is at least partially directed onto a glass product received within said clamping chuck.

20. A device for producing glass products for primary pharmaceutical packaging, comprising:
   a clamping chuck having a clamping head through which additional clamping rods extend to clamp a glass product;
   a drive for driving said clamping chuck rotatingly about a longitudinal axis thereof;
   a burner for heating the glass product received within said clamping chuck;
   a baffle structure for generating a gas current for cooling said clamping chuck when said clamping chuck is driven rotatingly, wherein said baffle structure is on an outer surface of said clamping head.

21. The device of claim 20, further comprising baffle plates on a central support body driven by said clamping chuck.

22. A device for producing glass products for primary pharmaceutical packaging, comprising:
   a clamping chuck having a clamping head through which additional clamping rods extend to clamp a glass product;
   a drive for driving said clamping chuck rotatingly about a longitudinal axis thereof;
   a burner for heating the glass product received within said clamping chuck; a baffle structure for generating a gas current for cooling said clamping chuck when said clamping chuck is driven rotatingly, wherein said baffle structure is on a central support body configured to be driven by said clamping chuck.

23. The device of claim 22, wherein the baffle structure is baffle plates on the central support body driven by said clamping chuck.

24. The device of claim 22, wherein further comprising vanes on an outer surface of said clamping head.

\* \* \* \* \*